(12) United States Patent
Yu et al.

(10) Patent No.: US 12,388,127 B2
(45) Date of Patent: Aug. 12, 2025

(54) SELF-HEATING BATTERY

(71) Applicant: GM GLOBAL TECHNOLOGY OPERATIONS LLC, Detroit, MI (US)

(72) Inventors: Zhiqiang Yu, Shanghai (CN); Haijing Liu, Shanghai (CN); Xiaochao Que, Shanghai (CN); Dave Gerard Rich, Sterling Heights, MI (US); Saad Hasan, Detroit, MI (US); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 434 days.

(21) Appl. No.: 17/854,692

(22) Filed: Jun. 30, 2022

(65) Prior Publication Data
US 2022/0336880 A1    Oct. 20, 2022

Related U.S. Application Data

(62) Division of application No. 16/487,914, filed as application No. PCT/US2017/023506 on Mar. 22, 2017, now Pat. No. 11,411,261.

(51) Int. Cl.
| | |
|---|---|
| *H01M 10/615* | (2014.01) |
| *H01G 11/06* | (2013.01) |
| *H01M 4/04* | (2006.01) |
| *H01M 4/66* | (2006.01) |
| *H01M 4/75* | (2006.01) |
| *H01M 4/80* | (2006.01) |
| *H01M 10/0525* | (2010.01) |
| *H01M 10/0587* | (2010.01) |
| *H01M 50/536* | (2021.01) |
| *H01M 50/538* | (2021.01) |

(52) U.S. Cl.
CPC ....... *H01M 10/615* (2015.04); *H01M 4/0404* (2013.01); *H01M 4/661* (2013.01); *H01M 4/75* (2013.01); *H01M 4/80* (2013.01); *H01M 10/0587* (2013.01); *H01M 50/538* (2021.01); *H01G 11/06* (2013.01); *H01M 10/0525* (2013.01); *H01M 50/536* (2021.01)

(58) Field of Classification Search
None
See application file for complete search history.

(56) References Cited

U.S. PATENT DOCUMENTS

| | | | |
|---|---|---|---|
| 5,434,017 A | 7/1995 | Berkowitz et al. | |
| 8,785,024 B2* | 7/2014 | Han | H01M 10/6552 165/104.19 |
| 8,968,905 B2 | 3/2015 | Sohn | |
| 9,882,197 B2 | 1/2018 | Wang et al. | |
| 9,929,445 B2 | 3/2018 | Yu et al. | |
| 10,079,413 B2 | 9/2018 | Kepler et al. | |
| 10,601,046 B2 | 3/2020 | Yu et al. | |
| 10,756,385 B2 | 8/2020 | Deng | |
| 2001/0024754 A1* | 9/2001 | Fukuzawa | C01G 53/50 429/231.95 |
| 2003/0124424 A1 | 7/2003 | Takahashi et al. | |
| 2006/0012342 A1 | 1/2006 | Kamenoff | |
| 2006/0197496 A1* | 9/2006 | Iijima | H01M 4/505 320/112 |
| 2008/0280197 A1 | 11/2008 | Machida | |
| 2009/0023058 A1* | 1/2009 | Kim | H01M 50/105 429/131 |
| 2010/0143773 A1 | 6/2010 | Honbou | |
| 2012/0261397 A1* | 10/2012 | Schwarz | B60L 58/13 219/202 |
| 2013/0230749 A1 | 9/2013 | Kim et al. | |
| 2014/0030560 A1* | 1/2014 | Lev | B60L 50/16 429/90 |
| 2015/0064511 A1 | 3/2015 | Wang et al. | |

(Continued)

FOREIGN PATENT DOCUMENTS

| | | | |
|---|---|---|---|
| CN | 201130695 Y | * | 10/2008 |
| CN | 202549958 U | | 11/2012 |

(Continued)

OTHER PUBLICATIONS

Machine translation of CN 201130695 Y, published on Oct. 8, 2008 (Year: 2008).*
Machine translation of JP 2006-073368, published on Mar. 16, 2006 (Year: 2006).*
Second Office Action for Chinese Patent Application No. 201780088743.0 issued Jul. 5, 2022, with correspondence dated Jul. 7, 2022, from China Patent Agent (H.K.) Ltd. summarizing contents; 8 pages.
Third Office Action for Chinese Patent Application No. 201780088743.0 issued Sep. 5, 2022, with correspondence dated Sep. 6, 2022, from China Patent Agent (H.K.) Ltd. summarizing contents; 7 pages.

(Continued)

*Primary Examiner* — Anca Eoff
(74) *Attorney, Agent, or Firm* — Harness, Dickey & Pierce, P.L.C.

(57) ABSTRACT

Lithium-based and sodium-based batteries and capacitors using metal foil current collectors, coated with porous layers of particles of active electrode materials for producing an electric current, may be adapted to produce heat for enhancing output when the cells are required to periodically operate during low ambient temperatures. A self-heating cell may be placed in heat transfer contact with a working cell that is temporarily in a cold environment. One or both of the anode current collector and cathode current collector of a heating cell may be formed with shaped extended portions, uncoated with electrode materials, through which cell current may be passed for resistance heating of the extended current collector areas. These extended current collector areas may be used to heat the working area of the cell in which they are incorporated, or to contact and heat an adjacent working cell.

15 Claims, 5 Drawing Sheets

(56) References Cited

U.S. PATENT DOCUMENTS

| | | | |
|---|---|---|---|
| 2015/0303444 A1* | 10/2015 | Wang | H01M 10/63 429/61 |
| 2016/0043447 A1 | 2/2016 | Peh et al. | |
| 2017/0098817 A1 | 4/2017 | Yu et al. | |
| 2018/0026311 A1* | 1/2018 | Hinterberger | B60L 58/15 429/50 |
| 2018/0331389 A1 | 11/2018 | Liu et al. | |
| 2018/0358656 A1 | 12/2018 | Deng | |
| 2019/0044097 A1 | 2/2019 | Yu et al. | |
| 2019/0288328 A1 | 9/2019 | Yu et al. | |
| 2019/0296333 A1 | 9/2019 | Liu et al. | |
| 2020/0235444 A1 | 7/2020 | Yu et al. | |

FOREIGN PATENT DOCUMENTS

| | | | | |
|---|---|---|---|---|
| CN | 103972581 A | | 8/2014 | |
| CN | 105518905 A | | 4/2016 | |
| CN | 105849968 A | | 8/2016 | |
| CN | 110402519 A | | 11/2019 | |
| DE | 102015002148 A1 | * | 8/2016 | ......... B60L 11/1862 |
| DE | 112017007094 T5 | | 11/2019 | |
| EP | 2738839 A1 | | 6/2014 | |
| JP | 2006073368 A | * | 3/2006 | |
| JP | 2013161559 A | | 8/2013 | |
| KR | 20150054702 A | | 5/2015 | |
| KR | 1020150104100 A | | 9/2015 | |
| WO | WO-2012147128 A1 | | 11/2012 | |
| WO | WO-2013012334 A1 | | 1/2013 | |
| WO | WO-2013146811 A1 | | 10/2013 | |
| WO | WO-2018174864 A1 | | 9/2018 | |

OTHER PUBLICATIONS

First Office Action for German Patent Application No. 112017007094.5 issued Jul. 21, 2023, with correspondence from Manitz Finsterwald Patent—und Rechtsanwaltspartnerschaft mbB summarizing Office Action; 5 pages.

International Search Report and Written Opinion for application No. PCT/US2017/023506 mailed Dec. 21, 2017, 8 pages.

First Office Action for Chinese Patent Application No. 201780088743.0 issued Jan. 30, 2022, with correspondence dated Feb. 9, 2022, from China Patent Agent (H.K.) Ltd. summarizing contents; 13 pages.

* cited by examiner

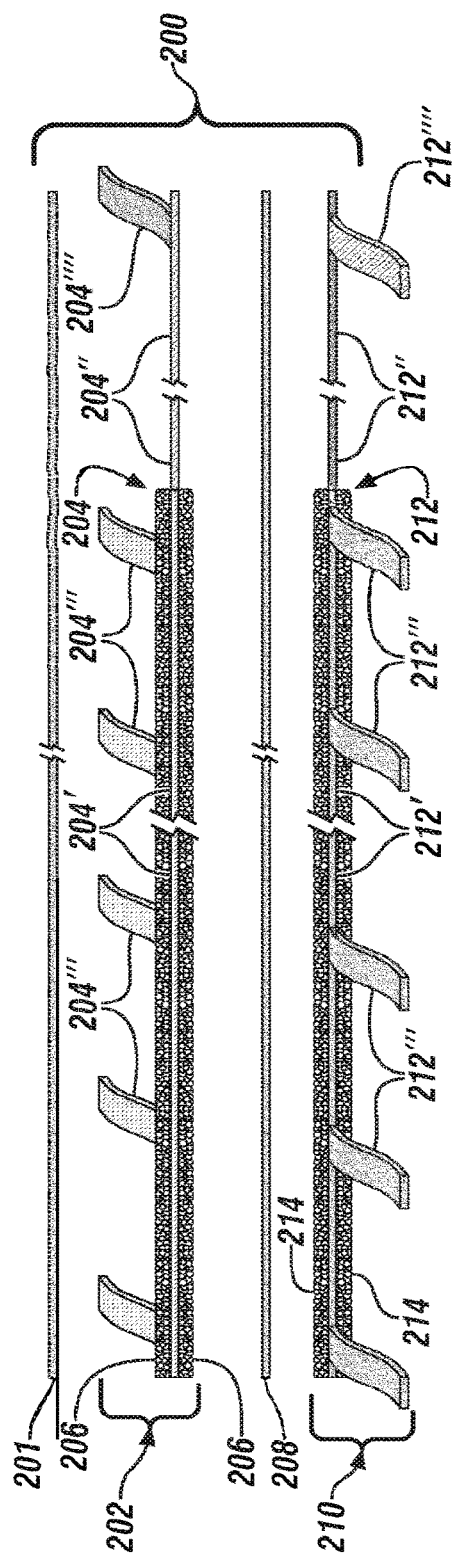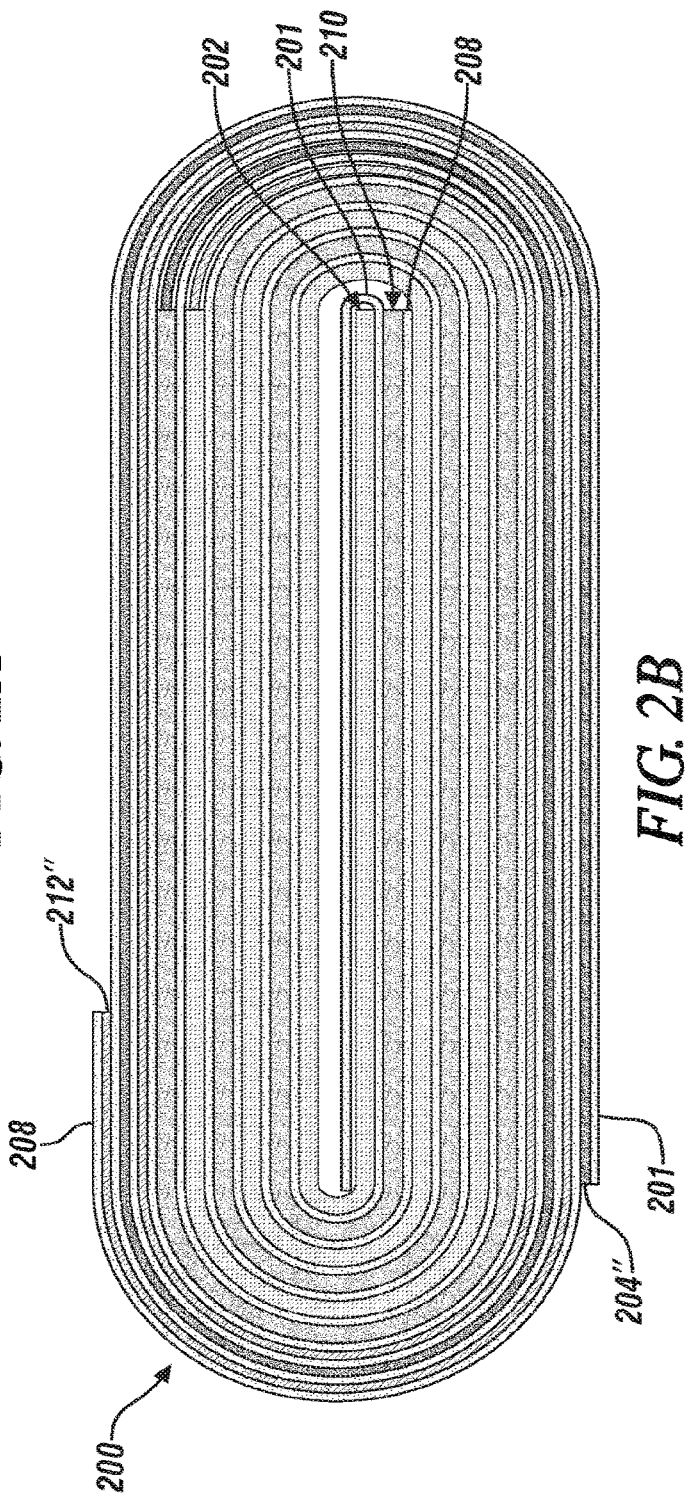
FIG. 2A
FIG. 2B

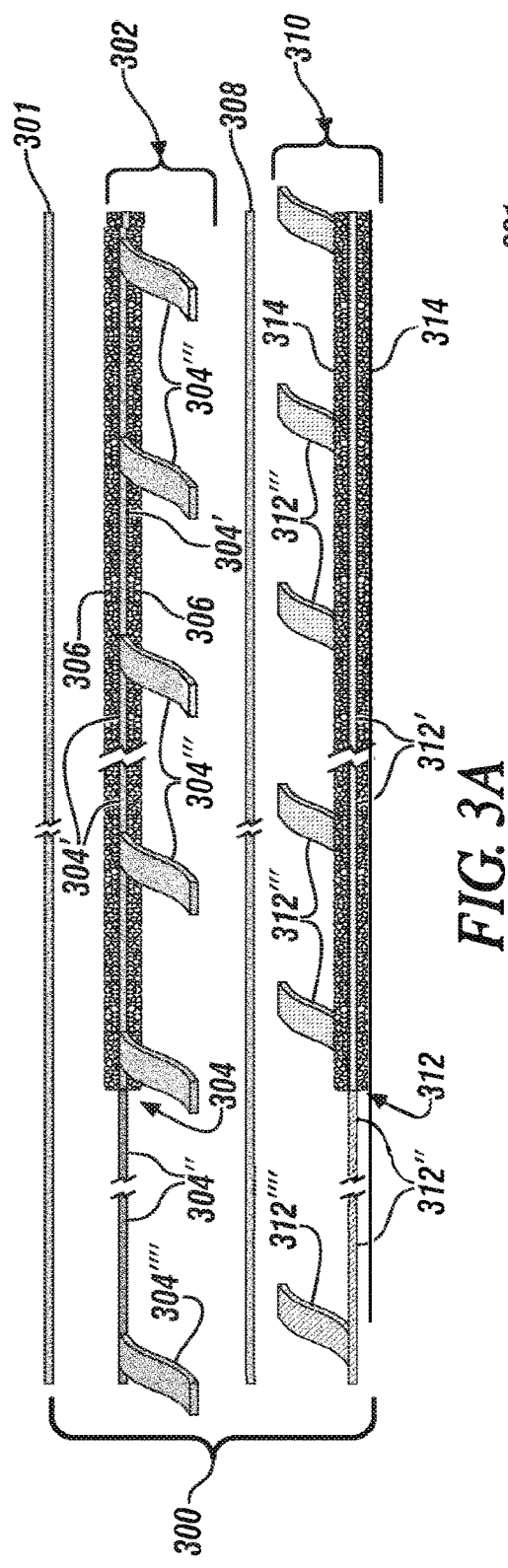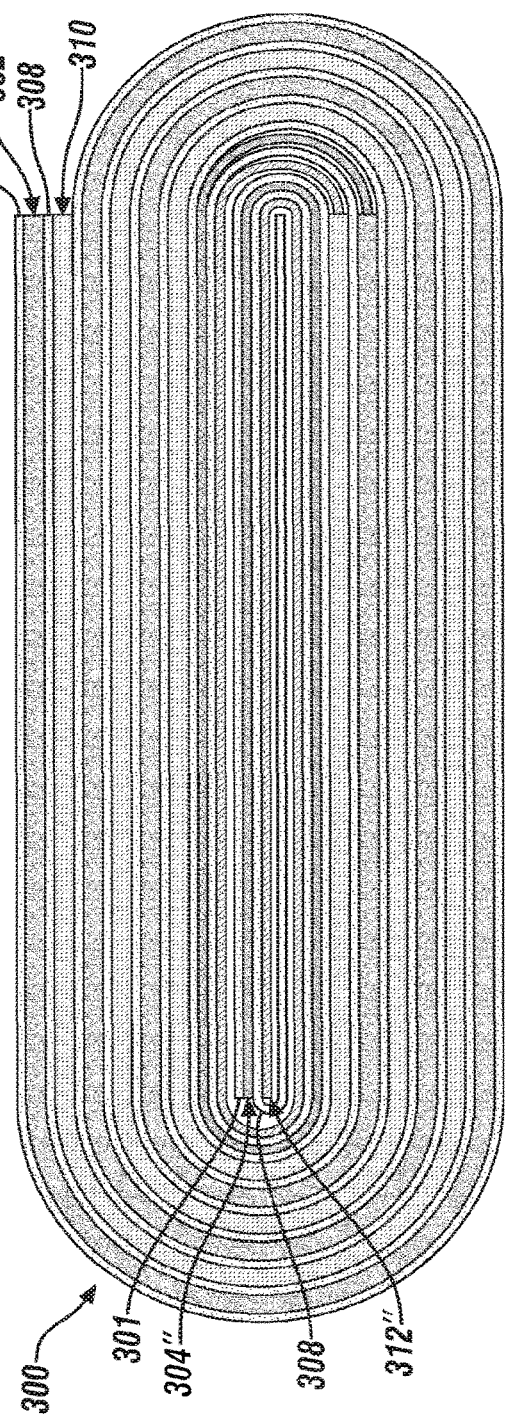

SELF-HEATING BATTERY

CROSS-REFERENCE TO RELATED APPLICATIONS

This application is a divisional of U.S. patent application Ser. No. 16/487,914 filed on Aug. 22, 2019, which is a 371 of PCT Application No. PCT/US2017/023506 filed on Mar. 22, 2017. The entire disclosures of each of the above applications are incorporated herein by reference.

TECHNICAL FIELD

Some lithium-based and sodium-based batteries and capacitors are periodically exposed to a cold environment in which the energy and power outputs of their electrochemical cells could be improved if they could be heated effectively and inexpensively. This disclosure pertains to like or complementary electrochemical cells, one of which has a self-heating capacity and may be used to periodically heat an adjacent working cell when it is exposed to a low temperature ambient environment. This disclosure also pertains to a cell having a working portion and a heating portion which is managed and controlled to be periodically activated to heat the working portion when it has been cooled in its operating environment.

BACKGROUND

Relatively light weight lithium-based batteries and capacitors and sodium-based batteries and capacitors are energy efficient and are increasingly used in many consumer applications. In some applications, such as in automotive vehicles, the battery or capacitor may be periodically exposed to low ambient temperatures that impair the performance of the cell. There remains a need to find effective methods of on-board heating of the cells of such batteries and capacitors during the occasions when they are required to work in a low temperature environment.

SUMMARY OF THE DISCLOSURE

Present lithium-based batteries often comprise an assembly of one or more electrochemical cells, each cell comprising an anode and cathode capable of intercalating and de-intercalating lithium from a non-aqueous electrolyte solution of a suitable lithium electrolyte salt. The anode and cathode are physically separated from direct electrical contact by a porous separator. The anode is often formed of particles of an active anode material, such as graphite or lithium titanate, which are resin-bonded in uniformly-thick, porous layers on each side of a thin, metal (often copper) current collector foil having low electrical resistance. The current collector foil may, for example, have a uniform thickness in the range of about five micrometers to fifteen micrometers and carry, on each opposing surface, a porous bonded coating layer of particulate electrode material that may range in thickness from about five micrometers to about one hundred micrometers, depending on the energy and power requirements of the cell.

The cathode is similarly formed of particles of an active cathode material, such as lithium iron phosphate (LiFePO4), lithium manganese oxide (LMO, LiMn2O4), and lithium nickel manganese cobalt oxide (LiNiMnCoO2). The selected active cathode material is likewise resin-bonded in porous uniformly thick layers on each side surface of a thin metal (often aluminum) current collector foil. The thicknesses of the porous cathode layers are usually comparable to the thickness of the corresponding anode material layers, depending on the electrical requirements of the electrochemical cell in which the cathode materials are used. Each of the anode and cathode material particles may be mixed with a quantity of electrically conductive carbon particles.

In many such batteries, each of the thin current collector foils is rectangular in shape, with side dimensions up to about 150 millimeters (in a stacked cell arrangement) and has an un-coated tab extending from one side for electrical connection with another electrode in an assembly of cells. In general present practice, the opposing major surfaces of the thin metallic current collectors are substantially fully covered with the porous layers of electrode material and the metallic current collectors provide a low-resistance path for the flow of electrons from and into their coatings of bonded electrode material during the operation (charge and discharge) of each lithium battery cell. All DC electrical current, flowing into and out of the cell, flows through the respective anode and cathode current collectors. The thin metal current collector compositions are selected to have relatively low electrical resistance so that resistance heating of the cell is not large. However, as will be described in detail below in this specification, present current collector shapes and compositions may be utilized with extended metal foil portions, not coated with electrode material, which may be shaped and modified to provide additional useful resistance heating during cell operation. This additional heating may be directed by the location or placement of the extended foil portion of the current collector and used to heat the instant working cell in which it is integrated, or an adjacent normal working cell.

In some cell assemblies, like-shaped anode and cathode layer structures are assembled in rectangular stacks with interposed thin, porous polymeric separators that physically separate the porous layers of opposing electrode materials but enable suitable infiltration with the electrolyte solution and the transport of lithium ions between the porous layers of electrode materials. In other cell structures, a long rectangular anode layer and a like-shaped long rectangular cathode layer, with interposed, like-shaped porous separator layers, may be formed as a wound or rolled lithium-based cell structure.

Lithium-based capacitors often have similar porous electrode and separator structures, but the respective anodes and cathodes are formed of particles of suitable presently known capacitor materials resin-bonded as porous layers to thin metallic current collector foils. The respective capacitor electrode materials are selected to efficiently absorb and de-absorb lithium ions from a suitable non-aqueous solution of a lithium electrolyte salt(s).

Sodium-based batteries and capacitors are similarly constructed, using particles of suitable known active anode and cathode compositions for the respective electrodes for the operation of the electrochemical cell of the battery or capacitor.

The electrode materials of each such lithium-based or sodium-based battery or capacitor are selected and formulated to function at a pre-determined temperature level or temperature range. Often such an operating temperature range may extend from about room temperature (e.g., 20° C.-25° C.) to about twenty to thirty Celsius degrees above room temperature. But in many applications for such batteries and capacitors, the device in which they are employed, such as automobiles, may be exposed to ambient temperatures that extend many degrees below the optimum operating temperature of the vehicle.

In accordance with practices of this invention, a unique battery or capacitor heating cell is prepared and adapted for self-heating when such heating is required. The battery or capacitor has a working portion and a self-heating portion as will be described. Alternatively, the heating cell may be adapted for use in combination with one or more separate regular working cells. In the latter application the heating cell will be placed in a stack or a roll in close proximity with a regular working cell, or group of working cells, of the battery or capacitor. The heating cell will often have a shape like that of the adjacent working cell or cells so that it can be placed in heat-transfer contact with the chilled working cells to be heated. The electrode materials of the heating cell may have the same compositions or similar compositions as the electrode materials of the working cells of the battery or capacitor. The electrochemical reactions of the heating cell may be like the electrochemical reactions of the working cell(s). The heating cell is activated by a suitable combination of temperature sensing and battery operation controllers when the heating cell or an adjacent working cell or group of cells requires heating in a cold environment.

In a first embodiment of the invention, a heating cell is prepared in which the compositions of the electrode materials, the compositions and structures of the anode and cathode current collectors, and the composition of the electrolyte and its solvent(s) are determined to provide extra heat when the cell is activated. By producing such extra heat, in addition to a usable current, such a self-heating battery or capacitor cell may be periodically activated to generate and transfer heat to an adjacent working cell which is presently required to function in a chilled ambient environment. The self-heating cell may be contained in the same pouch or container as the working cell. Or it may be separately contained in a material that enables the transfer of heat from the self-heating cell to an adjacent working cell whose function would be enhanced when it is warmed to a moderately higher temperature.

In accordance with a second embodiment of this invention, one or both of the current collector foils of the electrodes of the heating battery or capacitor cell are significantly modified so as to provide metallic electrically-resistive heating elements and surfaces for transferring heat to surfaces of its integral working cell or to surfaces of a closely positioned working cell or group of working cells.

As described above in this specification, the anode of a conventional lithium battery may, for example, be formed of a porous layer of lithium titanate particles and electrically-conductive carbon particles, resin-bonded to both sides of a suitably sized rectangular copper current collector foil. And the cathode may, for example, be formed of a porous layer of lithium iron phosphate particles and conductive carbon particles resin-bonded to both sides of a like sized, rectangular aluminum current collector foil. Except for connector tabs at one side of each current collector foil, active electrode material is applied to most of the available surface area in each side of each current collector in order to maximize the energy-providing performance of the battery cell.

However, in selected heating cells of this invention, a modified metal current collector foil is used in one or both of the anode and cathode of the cell. The shape of a portion of the current collector foil is retained to carry its porous layers of electrode material on each side. But it is recognized herein that in the function of the battery or capacitor, the current collector foil is heated by the flow of an electrical current in it. In normal cell operation the heating is accommodated by the thickness, surface area dimensions, and relatively low resistance of the current collector material.

But, in the subject heating cell, the generation of heat in the current collector is increased by intentionally providing an extended portion of the current collector foil, which is uncoated with electrode material. At least one side (or edge) of the electrode material-carrying current collector foil shape or area is extended to provide a desired amount of additional foil material (not coated with electrode material) that will also be resistance heated when electrical current, produced or discharged in the function of the cell, is intentionally directed through the extended foil material. This extended uncoated portion of the current collector may be integral with the coated portion of the current collector or it may be a separate current collector foil material which is joined (e.g., welded or soldered) to a selected edge of the electrode-material-coated current collector. This enlarged and extended portion of the current collector is also strategically shaped for wrapping around a predetermined surface area of the cell in which it is located or around heat-accepting surfaces of one or more adjacent working cells. This wrapping with the current collector extension provides a predetermined amount of heating surface contact with the working cells (or with a working portion of its own self-heating cell). Connector tabs on the electrode material-coated area of the current collector of the heating cell, and on the extended uncoated portion of the current collector, are suitably utilized, by control means located in conjunction with the battery or capacitor-powered device, to control the operation of the heating cell to those times when ambient temperatures require self-heating or heating of adjacent working cells for powering a function of the automobile or other battery-powered or capacitor-powered device.

In some applications, the metal composition or the thickness of the extended portion of the current collector may be changed to provide increased electrical resistance heating. And an outer side of the wrapped current collector (not in thermal contact with a surface to be heated) may be suitably coated with a thermally insulating material for directing more heat into the adjacent surface(s) to be heated. In applications in which current collector extensions from both electrodes of a heating cell are used, a non-conductive separator should be placed between the electrically conducting current collector extensions. And the size and shape of the extended portion of the current collector(s) may also be determined and used for enhancement of compaction or compression of the adjacent working cells.

In the above and following texts of this specification, describing practices of the subject invention, the descriptions are sometimes expressed in terms of a lithium battery. This is done with the intention and understanding that practices of the use of a heater cell may also be suitably adapted to lithium capacitors and to sodium-based batteries and capacitors using known electrode materials for the battery or capacitor.

Other advantages and embodiments of the invention will be apparent from the following illustrations of specific examples.

BRIEF DESCRIPTION OF THE DRAWINGS

FIG. 2A is a schematic enlarged side or edge view of the end portions of a first separator layer, a cathode electrode layer, a second separator layer, and an anode electrode layer for a self-heating cell (such as a lithium-ion battery cell) which is to be assembled by placing the layers in an overlying assembly and rolling them into a battery structure. Central portions of the strips of these cell elements have been cut away to reduce the size of the schematic illustration. In FIG. 2A, the extended current collector foil heating members (not coated with electrode material) for both the cathode and anode are arranged with intervening separators. The extended current collector members are at the right side of the embodiment illustrated in FIG. 2A. The assembly is rolled such that the heating current collector members are located on the outside of the rolled assembly.

FIG. 2B is an end view of the rolled assembly of initially flat layers of the first separator, the cathode electrode, the second separator, and the anode electrode of FIG. 2A. In FIG. 2B the ends of the outer uncoated heating portions of the cathode current collector and the anode current collector are on opposite sides of the rolled assembly.

FIG. 3A is schematic enlarged side or edge view of the end portions of a first separator, a cathode electrode, a second separator, and an anode electrode for a self-heating cell (such as a lithium battery cell) which is to be assembled by rolling the cell members. Again, central portions of the respective strips have been cut-away to reduce the size of the illustration. In FIG. 3A extended, uncoated, current collector foil heating members for both the cathode and anode are arranged with intervening separators. The extended members are at the left side of the embodiment illustrated in FIG. 3A. The assembly of overlying strips is to be rolled such that the heating current collector members are located on the inside of the rolled assembly.

FIG. 3B is an end view of the rolled assembly of the first separator layer, the cathode electrode layer, the second separator layer, and the anode electrode layer of FIG. 3A.

DETAILED DESCRIPTION

Figure 1A:
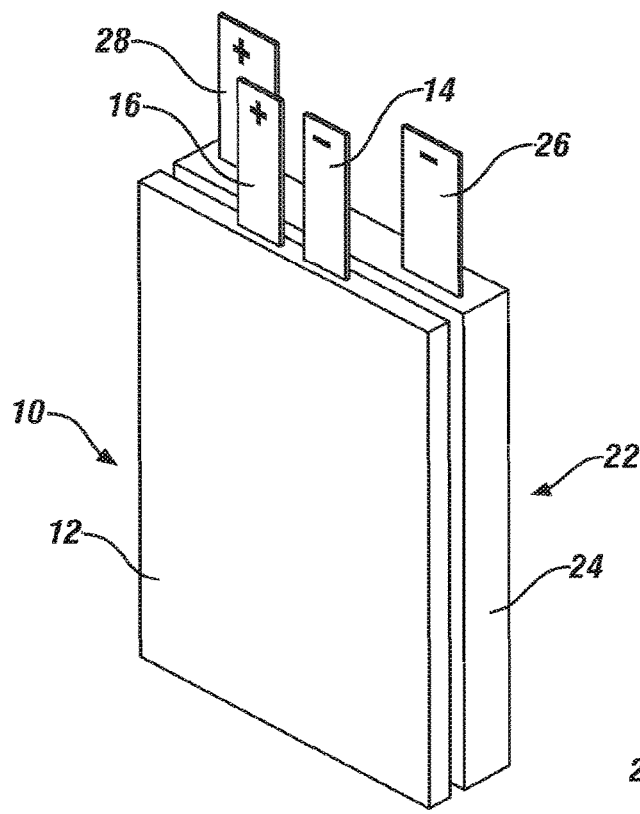
FIG. 1A is a schematic oblique view of a packaged core of a self-heating cell for a lithium battery that is placed side-by-side against a heat conducting surface of an enclosed packaged core of a working lithium battery. The heating cell is devised and managed to be activated when the working cell is temporarily operating in a chilled environment which has cooled the working cell to a temperature below its favored working temperature. Separate positive and negative electrode tabs are illustrated as extending from the top side of each of the heating cell core and of the core of the regular working cell.

In FIG. 1A, a schematic illustration is provided of the rectangular outline of the packaged core member 10 of a self-heating lithium-ion battery cell placed in face-to-face heat transfer contact with a packaged working cell member 22.

In this example, the packaged self-heating cell 10 has a flat, rectangular shape. The self-heating cell 10 includes the anode, cathode, and separator members of a lithium-ion battery. These porous cell members, infused and infiltrated with a non-aqueous lithium electrolyte solution, are contained and sealed within a suitable thin-wall pouch or container 12. The cell-member-containing pouch 12 may, for example, be formed of two facing polymer-coated aluminum sheets joined at their edges. The anode is formed of porous layers of particulate anode material resin-bonded to the opposing faces of an anode current collector foil. An uncoated anode current collector tab 14, indicating a negative charge, extends from the top side of the rectangular pouch-contained 12 assembly of core elements of the cell 10. The cathode is formed of porous layers of particulate cathode material bonded to the opposing faces of a cathode current collector foil. An uncoated cathode current collector tab 16, indicating a positive (+) charge, also extends from the top side of the rectangular pouch 12. Except for the extending tab members 14, 16, the cell members and liquid electrolyte are sealed within the pouch 12 or other suitable container.

The compositions of the respective heating cell members may be selected from known compositions for lithium-ion battery anode materials, cathode materials, separator materials, and lithium-containing electrolyte salts and non-aqueous solvents. As an example, the heating cell 10 of FIGS. 1A (and 1B) may be formed of lithium titanate and conductive carbon particles, resin bonded to a copper foil as an anode and particles of lithium manganese oxide and conductive carbon, resin-bonded to an aluminum current collector as a cathode. An exemplary electrolyte is a one molar solution of lithium hexafluorophosphate (LiPF6) in equal portions by volume of ethylene carbonate, ethyl methyl carbonate, and diethyl carbonate. And the working cell 22 may use graphite as an active anode material and lithium iron phosphate as the active cathode material. Working cell 22 may use the same electrolyte as the heating cell 10 or a different electrolyte.

In an illustrative example, a working cell 22 was formed with graphite particle anode, a particulate lithium iron phosphate cathode, and a 1M LiPF6 electrolyte, weighing 0.3 kg, and having a current capacity of 10 Ah. A heating cell 10 was formed with a lithium manganese oxide cathode, a lithium titanate anode, and a 1M LiPF6 electrolyte, weighing 0.04 kg, and having a current capacity of 1 Ah. The heating cell was operated at a discharge rate of 18 C for 60 seconds during which time it displayed a heat generation of 2722 Joules using about thirty percent of the state of charge of the heating cell. The internal resistance and the external resistance of the heating cell were both 0.07 ohm at −30° C. The working cell and heating cell were placed side-by-side and the heating cell was capable of increasing the operating temperature of the working cell 10 degrees Celsius (from −30° C. to −20° C.).

Referring again to FIG. 1A, the heating cell 10 is to function primarily as a self-heating cell when it is required to produce heat for the adjacent flat, rectangular-sided working lithium-ion battery cell core 22 enclosed within its pouch or like container 24. Anode current collector tab 26 and cathode current collector tab 28 extend from the top of the sealed container 24 in which working cell core 22 is sealed. And the function of working lithium-ion battery cell core 22 is to produce an electric current for powering, for example, an electric starting motor, an electric driving motor, and/or other electric power consuming devices in an automobile. When the ambient temperature is suitable for normal power-providing operation of the working lithium-ion battery core 22, operation of the heating cell core 10 may not be required. But the automobile or other device, powered by working battery core 22, will have a control system for the operation of working battery core 22. When the temperature of working battery core 22 falls below a specified level (or its performance related to temperature), the heating cell core 10 will be activated so that it produces its current in an external electrical circuit. It will thus function to provide heat which will be transferred from cell core 10 to working cell core 22.

As illustrated in FIG. 1A, one flat rectangular side of heating cell core 10 is placed face-to face against a flat rectangular side of a lithium-ion battery cell core 22. During the operation of heating cell core 10, it generates heat within its whole cell and heat is transferred through its side which faces and is pressed against a rectangular side of working cell core 22. In an embodiment distinct from that illustrated in FIG. 1A, heating cell 10 and working cell 22 may be located within a common container, spaced apart by a separator, and infused with a common electrolyte solution. In this embodiment, the heating cell serves, when activated, to heat the common electrolyte in heating the working cell.

Figure 1B:
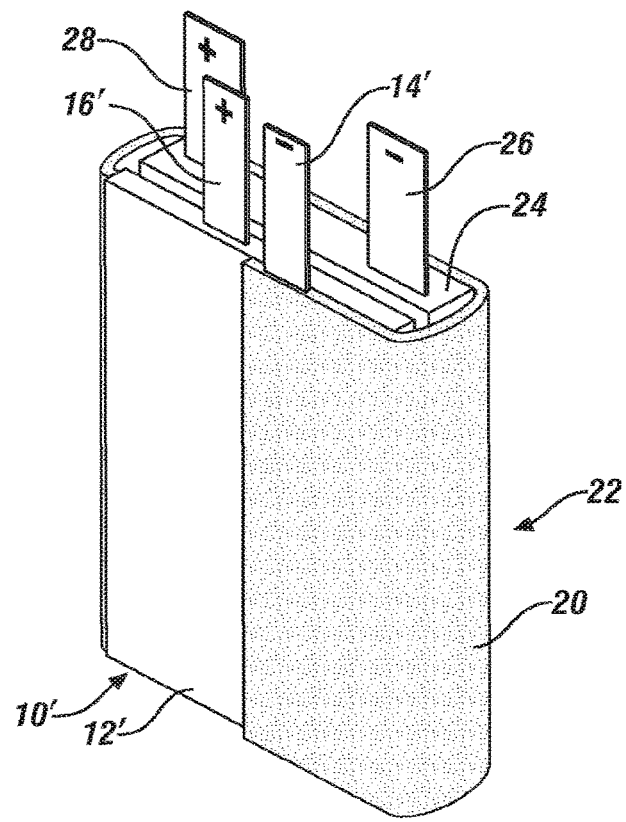
FIG. 1B is a schematic oblique view of an assembly of a packaged heating cell core and a packaged working cell core for a lithium battery, similar to the illustrated assembly in FIG. 1A. However in the embodiment of FIG. 1B an extended portion of the current collector foil (extending through the package container side) has been provided for one of the electrodes in the heating cell, and the extended portion of the current collector, serving as an electrically resistance heating element, has been wrapped around the sides and outer surface of the working cell core package and around one side of the heater cell core package and partially around the outer side of the heater cell core package.

The embodiment of the heating cell 10' illustrated in FIG. 1B provides an extended current collector foil 20 for markedly increasing the generation of heat using the current generation capacity of heating cell core 10', and for transferring the additional heat to and into working lithium-ion battery pouch 24 containing the cell members of working battery core 22. Heating cell 10' has been provided with a modified current collector 20 for one of its anode or cathode. In this embodiment, the modified current collector 20 is associated with its anode. An unseen portion of current collector 20 is coated on both sides with selected particles of active anode material which may be mixed with particles of conductive carbon and resin-bonded to the conventional portion of current collector 20 which is located in the heating cell core 10' retained within pouch 12'. But, as illustrated in FIG. 1B, a larger, uncoated portion of current collector 20 extends through a slit in the left side of pouch 12' and is wrapped around three outer sides of pouch 24 of working cell 22 and a portion of the outer surfaces of pouch 12' of heating cell 10'. Connector tab 14' projects from the top side of the extended, uncoated portion of current collector 20.

In this embodiment of FIG. 1B, when heating cell 10' is activated (by connection of its current collector tabs 14', 16' to an external circuit) for the purpose of heating working cell 22, the electrical current produced by cell 10' also flows in the uncoated, extended portion of current collector 20, heating it and surfaces that it contacts. Depending on the respective sizes of the sides of cell cores 10' and 22, the dimensions of the extended current collector foil may be up to 150 mm or so in width and several hundred millimeters in length.

In many examples of lithium-ion batteries, copper current collector foils are used for their low electrical resistance and their compatibility with particulate lithium-intercalating electrode materials that are bonded to them in porous electrode layers. But in a cell intended for heating itself or an adjacent working cell (like, e.g., cell 10'), the composition of the extended portion of the current collector foil, which is not coated with electrode material, may be selected for its electrical resistance heating capability and its flexibility in being shaped for contact, like the wrap-around contact in FIG. 1B, with cells of a working battery or capacitor. For example, at least the extended portion of the current collector 20 may be formed of copper, aluminum, stainless steel, nickel, metal alloys, or porous metal foam. The outer side of the extended portion of the current collector may be coated with an insulating material to better retain and direct its heat into the adjacent working cell.

Depending on the desired outside surface area of a working cell to be heated, the length of the extended portion (un-coated with active electrode material) of a current collector may be in the range of from one centimeter to about one-thousand centimeters. The extended portion of the current collector may be physically connected to the electrode material-coated portion of the current collector, and may be of a different composition, thickness, or structural character (e.g., it may be porous). The thickness of the extended portion of the current collector may be from about five micrometers to about 100 micrometers to protect the core of the working cell. The extended portion of the current collector may use several connector tabs to direct current flow to selected regions of the current collector and to avoid overheating of its tabs. The shape and size of the current collector foil may also be used to enhance compression or the assembly of the working cells and to protect them from outside damage.

FIGS. 2A, 2B, 2C, 3A, 3B, and 3C illustrate different embodiments of the invention that are applicable to rolled assemblies of the electrode and separator members of the lithium or sodium based batteries or capacitors. These embodiments and illustrations will be described in terms of a lithium-ion battery with the understanding that like practices can be readily adapted for lithium-based capacitors and sodium-based batteries and capacitors.

Figure 2C:
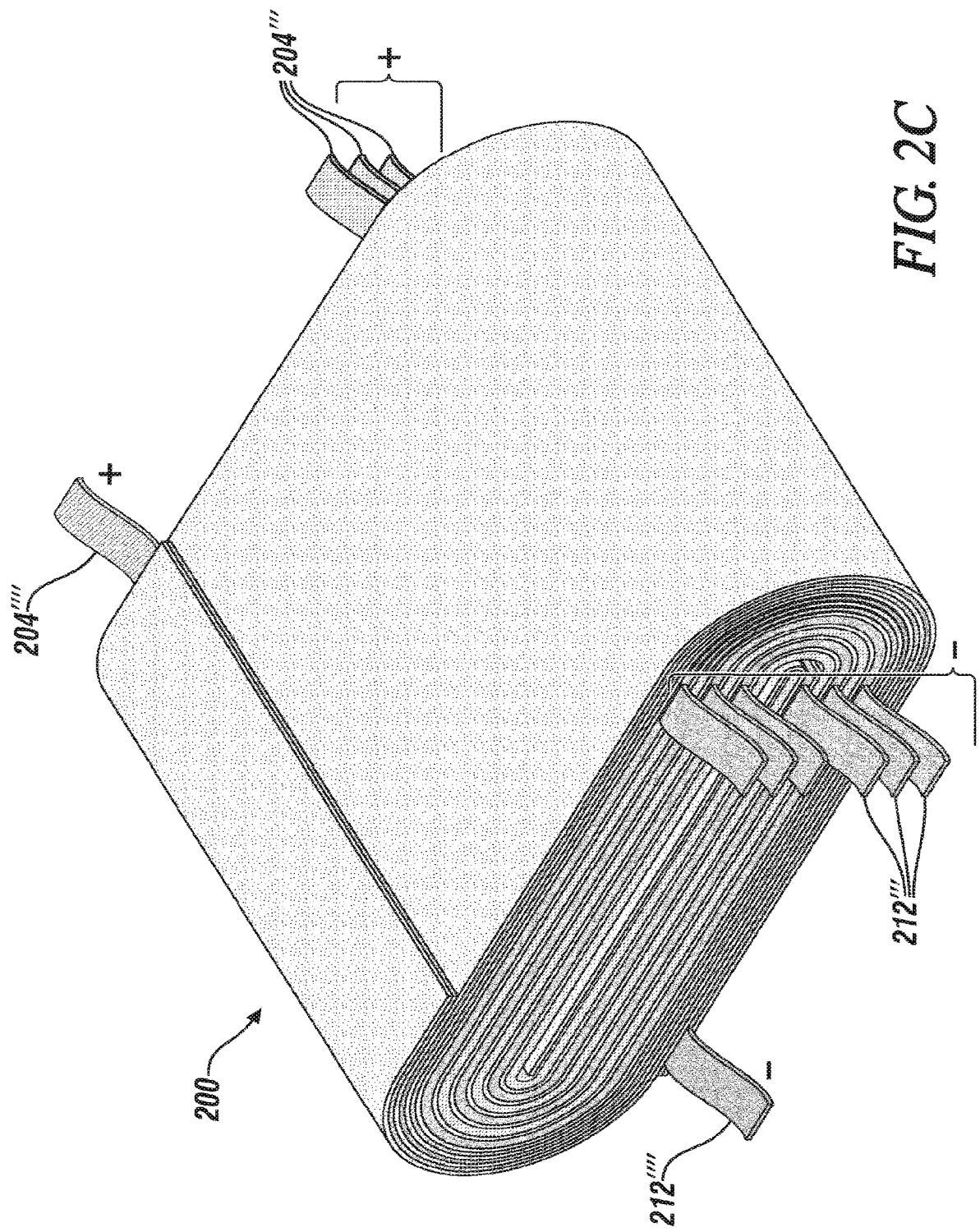
FIG. 2C is a schematic oblique view of one end and a side of the rolled lithium battery assembly of FIG. 2B. Positive and negative tabs for electrical connections to the current collectors of the working battery portion and the current collectors of the heating portion of the self-heating battery are illustrated. The positive connector tabs extend from the opposite side of the rolled battery structure from the negative connector tabs.

In FIG. 2A, a side edge view is presented of an assembly of four rectangular strip members positioned horizontally (spaced apart for purposes of illustration) for subsequent folding or rolling into a self-heating lithium-ion battery structure 200 having two major parallel flat surfaces with generally semi-circular rounded edges. The assembled and rolled lithium-ion battery assembly 200 is illustrated in FIG. 2C. The widths of the four rectangular strip members (for example, about 100 to 200 millimeters) are the substantially the same. But their functions differ and their lengths may also differ as will be described.

In FIG. 2A, the upper strip is a porous polymeric separator 201 which will be an outer member of the rolled battery assembly 200.

The next lower strip member of the assembly is a cathode electrode 202, comprising a central current collector foil 204. In a lithium-ion battery the cathode current collector foil may be formed of aluminum. Starting at its left end, as illustrated in FIG. 2A, a portion 204' of the aluminum current collector foil 204 is coated with a porous layer of particles of active cathode material 206 (such as lithium manganese oxide), resin-bonded to both major surfaces (top and bottom surfaces in FIG. 2A) of the current collector foil 204. The length of the cathode-material-coated foil surfaces 204' depends on the properties of the cathode material and the energy and power requirements of the cathode member of the lithium-ion battery. The cathode material-coated length 204' of current collector foil 204 may, for example, be several centimeters. A portion of the coated length 204' is broken out in FIG. 2A. The remaining, uncoated portion 204" of the current collector foil 204 has a length determined for providing heat to the assembled lithium-ion battery. The uncoated foil portion 204" (also with a broken out section in FIG. 2A) is the heating metal foil portion of the cathode of the assembled battery 200. As illustrated in FIGS. 2A-2C, the length of the porous polymer separator 201 and the full length of the cathode current collector 204 are substantially the same.

The next lower strip member of the lithium-ion battery assembly 200 is a second porous polymer separator member 208. Separator member 208 has a width and length for separating the coated and uncoated portions of the cathode electrode 202 and the coated and uncoated portions of the anode strip 210.

The next lower strip member of the assembly is an anode electrode 210, formed of a central current collector foil 212. In a lithium-ion battery the anode current collector foil may be formed of copper. Starting at its left end, as illustrated in FIG. 2A, a portion 212' of the copper current collector foil 212 is coated with a porous layer of particles of active anode material 214 (such as graphite or lithium titanate), resin-bonded to both major surfaces of the current collector foil 204. The length of the anode-material-coated foil 212' depends on the properties of the anode material and the energy and power requirements of the anode member of the lithium-ion battery. The anode material coated length 212' may be several centimeters. A portion of the coated length 212' is broken out in FIG. 2A. The remaining, uncoated portion 212" of the current collector foil 212 has a length determined for providing heat to the assembled lithium-ion battery. The uncoated foil portion 212" is the heating metal foil portion of the anode of the assembled battery 200. A portion of the uncoated current collector foil portion 212" is also broken out to fit the illustration in suitable drawing space. As illustrated in FIGS. 2A-2C, the length of the porous polymer separator 208 and the full length of the anode current collector 212 are substantially the same.

The cathode current collector foil 204 will have one or more electrical connector tabs 204''' extending from an end portion and other portions of its cathode material-coated portion 204' and will have at least one electrical connector tab 204'''' extending from its extended heating portion 204" which is not coated with cathode material. These cathode connector tabs, 204''', 204'''' are illustrated in FIGS. 2A and 2C. The cathode tabs would have a positive (+) charge when battery 200 is operating. The anode current collector foil 208 will have one or more electrical connector tabs 208''' extending from an end portion and other portions of its anode material-coated portion 208' and will have at least one electrical connector tab 208'''' extending from its extended heating portion 208" which is not coated with cathode material. These anode connector tabs are also illustrated in FIGS. 2A and 2C. The anode tabs would have a negative (−) charge when the battery 200 is operating.

FIG. 2B illustrates an end view (or edge view) of the lithium-ion battery 200, formed as a rolled assembly of the four lithium-ion battery members illustrated as layered members in FIG. 2A. As illustrated in FIGS. 2B and 2C, the rolled battery has generally flat upper and lower surfaces with generally semi-circular side edges. As seen in FIG. 2B, one set of ends of the separator 201, the cathode 202, separator 208, and anode 210 are aligned in the interior of the rolled battery 200. In this illustration the electrode material coated portions of the separated anode and cathode layers extend through approximately three full rolled layers of the battery. The separator 201, the uncoated heater portion of cathode current collector 204", separator 208, and the uncoated heater portion of anode current collector extend further in the rolled structure. As illustrated in FIG. 2B, the lengths of the outer separator 201 and underlying cathode heater current collector foil 204" permit them to be extended about one and one-half turns, terminating at the bottom of the rolled structure of the self-heating battery 200. And the greater lengths of separator 208 and anode heater current collector foil 212" permit them to extend in the wrapped structure to the upper surface of the rolled structure of the self-heating battery 200.

The rolled lithium-ion battery assembly 200 would be placed in a close-fitting container (not illustrated) in a dry, inert environment, the porous components suitably infiltrated with a suitable liquid solution of a lithium salt electrolyte, and the container sealed with only the electrical connector tabs extending outside of the container.

Thus, in the embodiment of the lithium-ion battery depicted in FIGS. 2A-2C, the cathode material-coated portion 204' of the wound cathode current collector foil 204 and the anode material coated portion 212' of the wound anode current collector foil 212 are located on the inner layers of the rolled battery assembly. And the heating portion 204" of the wound cathode current collector foil 204 and the heating portion 212" of the anode current collector foil 212 are on the outer layers of the rolled battery assembly 200. The electrical energy producing function of the battery may be activated by connecting one or more of the working cathode tabs 204''' and one or more of the working anode tabs 212''' to an intended external working load, such as an electric motor on an automobile. However, when a temperature sensor and a battery control system associated with the lithium-ion battery 200 senses that a low ambient temperature is affecting battery performance, the outer heating portions of the respective current collectors may be activated to heat the working portion of the battery. And heat from the outer heating portions of the current collectors 204", 212" may be transferred into an adjacent battery placed against one of the outer surfaces of the lithium-ion battery cell 200.

The heating function of one or both of the separated heated portions 204", 212" may be activated by connecting their respective connector tabs 204'''', 212'''' to an external load. Current flow through the heating portions of the uncoated current collector foils may be enhanced by using one electrode tab of the working portion of the battery and an opposing tab of the heater portion of the battery cell to direct the current produced on the battery cell through the heating portion of the cathode current collector 204" and/or the heating portion of the anode current collector 212". And as described above in this specification, the heating capacities of the respective current may be enhanced by forming the un-coated portion of the current collector(s) of a different metal composition or structure than the electrode material-coated portion of the current collector.

Figure 3C:
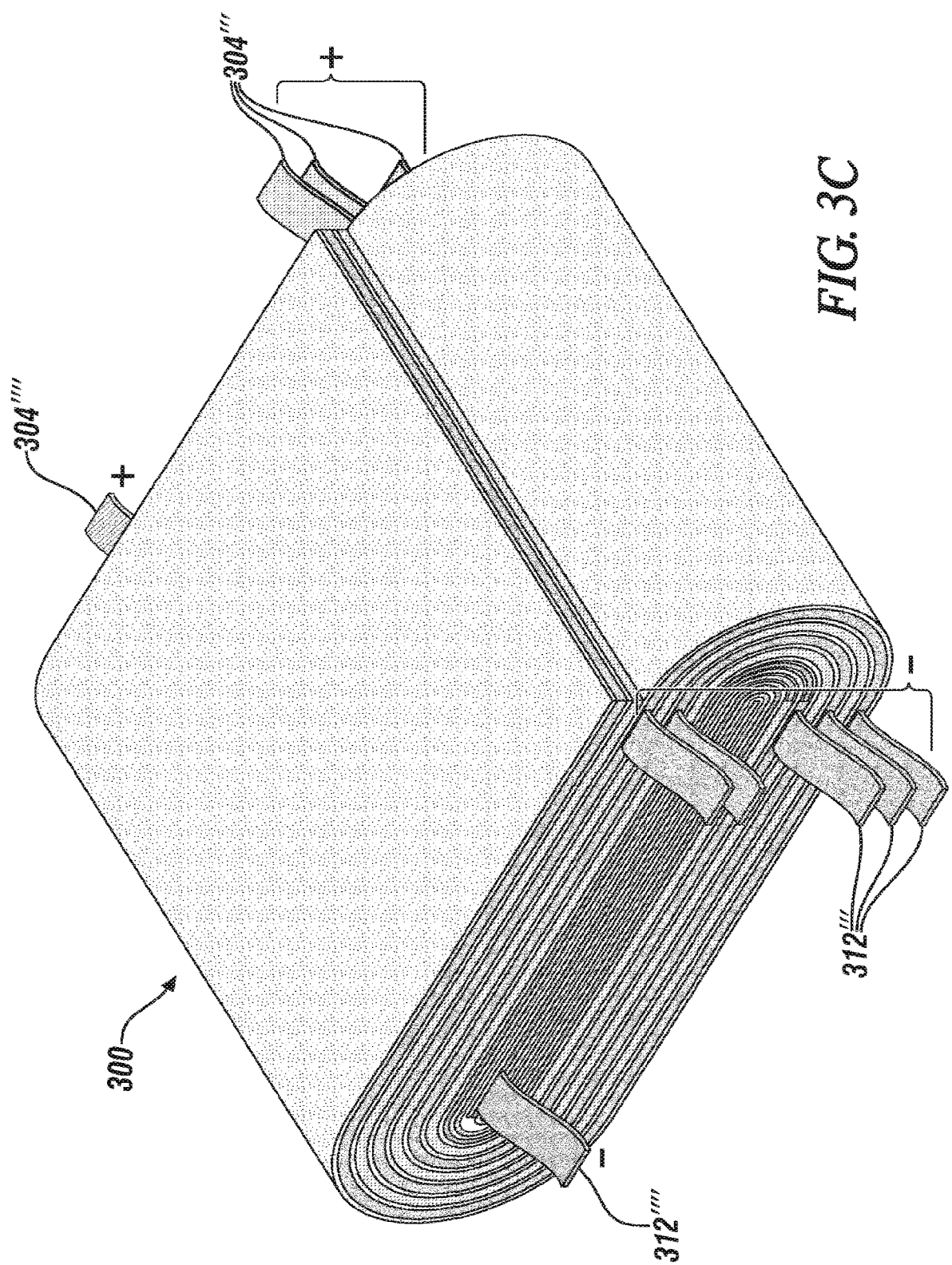
FIG. 3C is a schematic oblique view of one end and a side of the rolled lithium battery assembly of FIG. 3B. Positive and negative tabs for electrical connections to the current collectors of the working battery portion and the current collectors of the heating portion of the self-heating battery are illustrated. The positive connector tabs extend from the opposite side of the rolled battery structure from the negative connector tabs.

In the embodiment of a self-heating lithium-ion battery structure as illustrated in FIGS. 3A-3C, the extended heating portions of the anode and cathode current collectors are positioned in the interior of the rolled battery structure 300.

In FIG. 3A, a side edge view is presented of an assembly of four rectangular strip members positioned horizontally for rolling into a self-heating lithium-ion battery structure 300 having two major parallel flat surfaces with generally semi-circular rounded edges. The assembled and rolled lithium-ion battery assembly 300 is illustrated in FIGS. 3B and 3C. The widths of the four rectangular strip members (for example, about 100 to 200 millimeters) are the substantially the same. But their functions differ and their lengths may also differ as will be described.

In FIG. 3A, the upper strip is a porous polymeric separator 301 which will be an outer member of the rolled battery assembly.

The next lower strip member of the illustrated assembly is a cathode electrode 302, comprising a central current collector foil 304. In a lithium-ion battery the cathode current collector foil may, for example, be formed of aluminum. Starting at its right end, as illustrated in FIG. 3A, a portion 304' of the aluminum current collector foil 304 is coated with a porous layer of particles of active cathode material 306 (such as lithium manganese oxide), resin-bonded to both major surfaces 304' of the current collector foil 304. The length of the cathode material-coated foil 304' depends on the properties of the cathode material and the energy and power requirements of the cathode member of the lithium-ion battery. The cathode material-coated length 304' may be several centimeters. A portion of the coated length 304' is broken out in FIG. 3A. The remaining, uncoated portion 304" of the current collector foil 304 has a length determined for providing heat to the assembled lithium-ion battery. The uncoated foil portion 304" is the heating metal foil portion of the cathode of the assembled battery 300. A portion of the illustrated uncoated foil portion is also broken out. But as illustrated in FIGS. 3A and 3B, the length of the porous polymer separator 301 and the full length of the cathode current collector 304 are substantially the same.

The next lower strip member of the illustrated lithium-ion battery assembly 300 is a second porous polymer separator member 308. Separator member 308 has a width and length for separating the coated and uncoated portions of the cathode electrode 302 and the coated and uncoated portions of the anode strip 310.

The next lower strip member of the illustrated assembly is an anode 310, comprising a central current collector foil 312. In a lithium-ion battery the anode current collector foil may, for example, be formed of copper. Starting at its right end, as illustrated in FIG. 3A, a portion 312' of the copper current collector foil 312 is coated with a porous layer of particles of active anode material 314 (such as graphite or lithium titanate), resin-bonded to both major surfaces of the current collector foil 304. The length of the anode material-coated foil 312' depends on the properties of the anode material and the energy and power requirements of the anode member of the lithium-ion battery. The anode material-coated length 312' may be several centimeters. A portion of the coated length 312' is broken out in FIG. 3A. The remaining, uncoated portion 312" of the current collector foil 312 has a length determined for providing heat to the assembled lithium-ion battery. The uncoated foil portion 312" is the heating metal foil portion of the anode of the assembled battery 300. As illustrated in FIGS. 3A-3C, the length of the porous polymer separator 308 and the full length of the anode current collector 312 are substantially the same.

The cathode material-coated portion 304' of cathode current collector foil 304 will have one or more electrical connector tabs 304''' extending from an end portion and other portions of its cathode material-coated portion 304' and will have at least one electrical connector tab 304"" extending from its extended heating portion 304" which is not coated with cathode material. These cathode connector tabs are illustrated in FIGS. 3A and 3C. The cathode tabs 304''' and 304"" will typically have a positive (+) charge when the battery cell is discharging. The anode current collector foil 308 will have one or more electrical connector tabs 308"" extending from an end portion and other portions of its anode material-coated portion 308' and will have at least one electrical connector tab 308" " extending from its extended heating portion 308" which is not coated with anode material. These anode electrical connector tabs are also illustrated in FIGS. 3A and 3C. The anode tabs will typically have a negative (−) charge when the battery cell is discharging.

FIG. 3B illustrates an end view of a lithium-ion battery 300 formed as a rolled assembly of the four lithium-ion battery members illustrated as layered members in FIG. 3A. As illustrated in FIG. 3B, the rolled battery 300 has generally flat upper and lower surfaces with generally semi-circular sides. As seen in FIG. 3B, the ends of the separator 301, the uncoated heater portion of cathode current collector 304", separator 308, and the uncoated heater portion of anode current collector 312" are placed at the left side of the interior of the rolled battery 300. In this illustration the lengths of the separators 301, 308, the uncoated heater portion 304" of the cathode, and the unheated portion 312" of the anode permit them to be wound about one and one-half turns in the interior of the rolled self-heating battery 300. Thereafter, the interposed separators 301, 308, the cathode material-coated portion 304' of cathode current collector 304, and the anode material-coated portion of 312' of anode current collector 312 are wound more than two and one-half turns in the rolled battery 300, ending with their matching edges on the upper outer surface of rolled battery as illustrated in FIGS. 3B and 3C.

The rolled lithium-ion battery assembly 300 would be placed in a close-fitting container (not illustrated) in a dry, inert environment, the porous components suitably infiltrated with a suitable liquid solution of a lithium salt electrolyte, and the container sealed with only the electrical connector tabs extending outside of the container.

Thus, in the embodiment of FIGS. 3A-3C, the separated, uncoated heating portions 304" and 312" of the cathode current collector 304 and the anode current collector 312 are located in the interior layers of the rolled lithium-ion battery 300. And the cathode material-coated portion 304' of the cathode current collector foil 304, the anode material-coated portion 312' of the anode current collector 312, with their interposed separators 301, 308 constitute the outer layers of the rolled battery 300. The electrical energy producing function of the battery may be activated by connecting one or more of the working cathode tabs 304''' and one or more of the working anode tabs 312''' to an intended external working load, such as an electric motor on an automobile. However, when a temperature sensor and a battery control system associated with the lithium-ion battery 300 senses that a low ambient temperature is affecting battery performance, the inner heating portions 304", 312" of the respective current collectors may be activated to heat the working portion of the battery.

The heating function of one or both of the separated heated portions 304", 312" may be activated by connecting their respective connector tabs 304"", 312"" to an external load. Current flow through the heating portions of the uncoated current collector foils may be enhanced by using one electrode tab of the working portion of the battery and an opposing tab of the heater portion of the battery cell to direct the current produced on the battery cell through the heating portion of the cathode current collector 304" and/or the heating portion of the anode current collector 312". And as stated, the heating capacities of the respective current collector(s) may be enhanced by forming the un-coated portion of the current collector(s) of a different metal composition or different structure (e.g., porous metal foam) than the electrode material-coated portion of the current collector.

As described and illustrated in this specification, current collectors for the anodes and cathode of lithium and sodium based batteries and capacitors may be modified such that extended portions of the thin metal conductors, uncoated with electrode material, may be adapted for occasional, necessary heating of the cell in which they are located or in an adjacent cell or cells. Connector tabs on the extended portions of the current connectors may be utilized to enhance the flow of a heating current through the extended portions. The metal compositions and metal structures of the extended current collector sheet areas may be chosen for increased generation of heat. The sizes and shapes of the extended sheets may be adapted to bending or shaping for increased contact with an adjacent working cell to be heated. And the sizes and shapes of the extended current collector may be provided to closely compact and hold a working cell to the heating cell. Outer surfaces of the heating portions of the current collector sheets may be coated or covered with an insulating material to better direct the flow of the heat produced in them.

For management of the length of the subject disclosure, the above disclosures of the use of heating cells and working cells have been based on their usage in lithium-ion battery cells. However, it will be obvious to one skilled in the art of lithium-based capacitor cells and sodium-based battery and capacitor cells that self-heating cell/working cell combinations and extended current collectors may be adapted for use in such related electrochemical cells. Electrode material compositions and electrolyte compositions are known and used in lithium capacitors and sodium-based batteries and capacitors and readily selected for use in their heating and working cells. And extended current collector foils, uncoated with active electrode materials are readily adapted for use in lithium capacitors and sodium batteries and capacitors.

The above disclosures of illustrative embodiments are not intended to limit the proper scope of the following claims.

The invention claimed is:

1. A battery or capacitor comprising:
a working cell comprising a working anode, a working cathode, and a first porous separator disposed therebetween, the working anode including a working anode current collector foil having a first anode material layer including particles of a first active anode material comprising graphite bonded to the working anode current collector foil, and the working cathode including a working cathode current collector foil having a first cathode material layer including particles of a first active cathode material bonded to the working cathode current collector foil; and
a self-heating cell disposed in heat transfer contact with the working cell, the self-heating cell comprising a heating anode, a heating cathode, and a second porous separator disposed therebetween, the heating anode including a heating anode current collector foil having a second anode material layer including particles of a second active anode material comprising lithium titanate bonded to the heating anode current collector foil, the heating cathode including a heating cathode current collector foil having a second cathode material layer including particles of a second active cathode material comprising lithium manganese oxide bonded to the heating cathode current collector foil, and each of the heating anode and cathode current collector foils being in electrical contact with an external electrical circuit, wherein, when an electrical current is produced by the self-heating cell and passed through the external electrical circuit, heat is generated in the self-heating cell by electrical resistance heating and heat is transferred from the self-heating cell to the working cell.

2. The battery or capacitor of claim 1, wherein the working cell is constructed to produce a specified electrical current when operating in a specified ambient temperature range to an external electrically powered device, and the self-heating cell is constructed to produce a specified electrical current for heating itself and the working cell when the working cell is operating while exposed to an ambient temperature below the specified ambient temperature range.

3. The battery or capacitor of claim 1, wherein the internal electrical resistance of the self-heating cell is greater than that of the working cell.

4. The battery or capacitor of claim 1, wherein at least one of (i) the heating anode current collector foil is formed of a metal composition having a higher electrical resistance than the working anode current collector foil, and (ii) the heating cathode current collector foil is formed of a metal composition having a higher electrical resistance than the working cathode current collector foil.

5. The battery or capacitor of claim 1, wherein the working anode and cathode and the heating anode and cathode of the working cell and the self-heating cell are flat layers of like peripheral shape, contained in separate containers, and the separate containers are stacked in parallel alignment in heat transfer contact.

6. The battery or capacitor of claim 1, wherein the working anode and cathode and the heating anode and cathode of the working cell and the self-heating cell are flat layers of like peripheral shape, contained in the same container, and the electrodes are stacked in parallel alignment in the same container.

7. The battery or capacitor of claim 1, further comprising a non-aqueous liquid electrolyte infiltrating pores of the second anode material layer of the heating anode, the second cathode material layer of the heating cathode, and the second porous separator, wherein the heating anode, the heating cathode, and the second porous separator are sealed within a pouch having a thin wall, wherein each of the heating anode and cathode current collector foils having a connector tab that extends through the thin wall of the pouch, and wherein the connector tabs of the heating anode and cathode current collector foils are in electrical contact with the external electrical circuit.

8. A lithium-based battery, the battery comprising:
a working cell comprising a working anode, a working cathode, and a first porous separator disposed therebetween, the working anode including a working anode current collector foil having a first anode material layer including particles of a first active anode material comprising graphite bonded to the working anode current collector foil, and the working cathode including a working cathode current collector foil having a first cathode material layer including particles of a first active cathode material bonded to the working cathode current collector foil;
a self-heating cell disposed in heat transfer contact with the working cell, the self-heating cell comprising a heating anode, a heating cathode, and a second porous separator disposed therebetween, the heating anode including a heating anode current collector foil having a second anode material layer including particles of a second active anode material comprising lithium titanate bonded to the heating anode current collector foil, the heating cathode including a heating cathode current collector foil having a second cathode material layer including particles of a second active cathode material bonded to the heating cathode current collector foil, and each of the heating anode and cathode current collector foils being in electrical contact with an external electrical circuit; and a non-aqueous liquid electrolyte infiltrating pores of the first and second anode material layers of the working anode and the heating anode, the first and second cathode material layers of the working cathode and the heating cathode, and the first and second porous separators, wherein, when an electrical current is produced by the self-heating cell and passed through the external electrical circuit, heat is generated in the self-heating cell by electrical resistance heating and heat is transferred from the self-heating cell to the working cell.

9. The lithium-based battery of claim 8, wherein the second active cathode material of the self-heating cell comprises lithium manganese oxide.

10. The lithium-based battery of claim 9, wherein the first active cathode material of the working cell comprises lithium iron phosphate.

11. The lithium-based battery of claim 8, wherein the working cell is constructed to produce a specified electrical current when operating in a specified ambient temperature range to an external electrically powered device, and the self-heating cell is constructed to produce a specified electrical current for heating itself and the working cell when the working cell is operating while exposed to an ambient temperature below the specified ambient temperature range.

12. The lithium-based battery of claim 8, wherein an internal electrical resistance of the self-heating cell is greater than that of the working cell.

13. The lithium-based battery of claim 8, wherein (i) the heating anode current collector foil is formed of a metal composition having a higher electrical resistance than that of the working anode current collector foil, and/or (ii) the heating cathode current collector foil is formed of a metal composition having a higher electrical resistance than that of the working cathode current collector foil.

14. The lithium-based battery of claim 8, wherein the working anode and the working cathode of the working cell and the heating anode and the heating cathode of the self-heating cell are flat layers of like peripheral shape, contained in separate containers, and the separate containers are stacked in parallel alignment in heat transfer contact.

15. The lithium-based battery of claim 8, wherein the working anode and the working cathode of the working cell and the heating anode and the heating cathode of the self-heating cell are flat layers of like peripheral shape, contained in the same container and stacked in parallel alignment in the same container.

* * * * *